Figure 1:
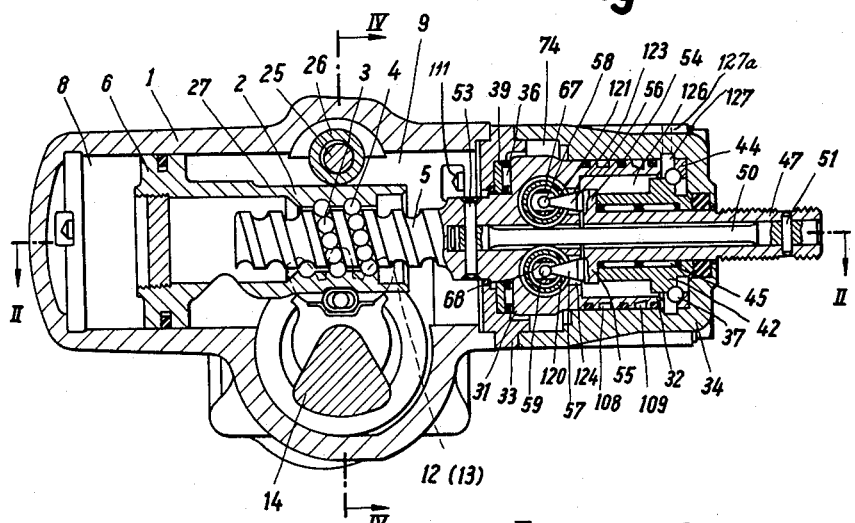

April 27, 1965   E. JABLONSKY   3,180,233
POWER STEERING DEVICE EFFECTING ROAD REACTION
Filed Sept. 6, 1961   3 Sheets-Sheet 1 by: Albert M Zalkind

United States Patent Office 3,180,233
Patented Apr. 27, 1965

3,180,233
POWER STEERING DEVICE EFFECTING
ROAD REACTION
Erich Jablonsky, Schwabisch Gmund, Germany, assignor to Zahnradfabrik Friedrichshafen Aktiengesellschaft, Friedrichshafen, Germany
Filed Sept. 6, 1961, Ser. No. 136,328
9 Claims. (Cl. 91—374)

This invention relates to power steering devices and more particularly to devices of the type which simulate a certain amount of steering or road reaction so that the driver must overcome a predetermined degree of resistance in order to steer the vehicle, thereby effecting a naturalness of steering function.

Devices of the general type which impart so-called "road feel" in power steering systems are not new and various arrangements and mechanisms for achieving such effect have been known for some time. The present invention, however, has for its object the construction of a simple mechanism which may be economically manufactured and which will give substantial maintenance free operation by virtue of its simplicity and inherent ruggedness of parts.

The essential feature of the invention is to provide piston valves for control of a power boost piston having differential areas exposed to the same pressure fluid which actuates the piston. Thus, an unbalance of force is effected when said valve pistons are actuated via a steering shaft, to the end that the vehicle driver must overcome such unbalance in turning the steering wheel and thereby receives a sense of road feel. More specifically, a pair of piston valves, or piston spools are utilized which are alternately operable depending whether steering is to the left or to the right, a respective valve being used for each direction of steering. The valves are actuated by means of a yieldable member such as a torsion bar or torque rod, which is part of the steering shaft, and to which is imparted a slight twisting strain when the steering shaft is rotated by the driver, thus effecting rotation of a valve-actuated sleeve which actuates one valve or the other to the effect passage of oil pressure to one end or the other of a double-acting cylinder. Thus, for steering to the left, one valve would be actuated to control oil pressure to one end of the cylinder and to exhaust the other end of the cylinder while the other valve would be moved to a neutral position and be virtually inactive. However, the one valve, by virtue of a novel construction and coaction with a fixed valve sleeve, would be exposed to differential pressures to effect resistance to its being moved, thus accomplishing a road feel function. The inactive valve, on the other hand, is pressure balanced and does not impart resistance or reaction to rotation of the steering shaft.

By a novel arrangement of the valve and the valve-actuating components, a very rugged and compact as well as simple mechanism is achieved, this being among the objects of the invention, other objects of which will be apparent. Thus, for versatility the construction of the valves may be made with elimination of differential areas so that no reaction is felt. This can be accomplished by a simple manufacturing change and is advantageous in power boost steering systems for tractors, lift trucks, and the like. In other words, a mere substitution of valve pistons and their respective valve sleeves in a mechanism, as disclosed herein, results in a system usable either for passenger vehicles with one type of valve pistons or spools, or for tractors, etc. with another valve type, by mere change in dimension of readily substitutable valve parts receivable in the same component of the mechanism. Accordingly, the invention has considerable versatility in this regard and, further, due to its compactness, it may readily be used in conjunction with steering mechanisms of the so-called "folded or coupled type."

Figure 2:
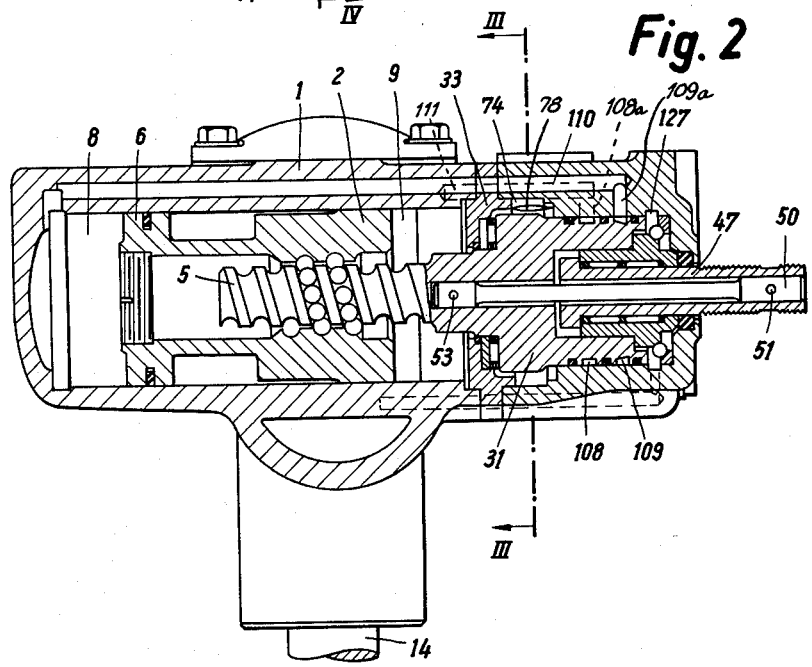
Figure 3:
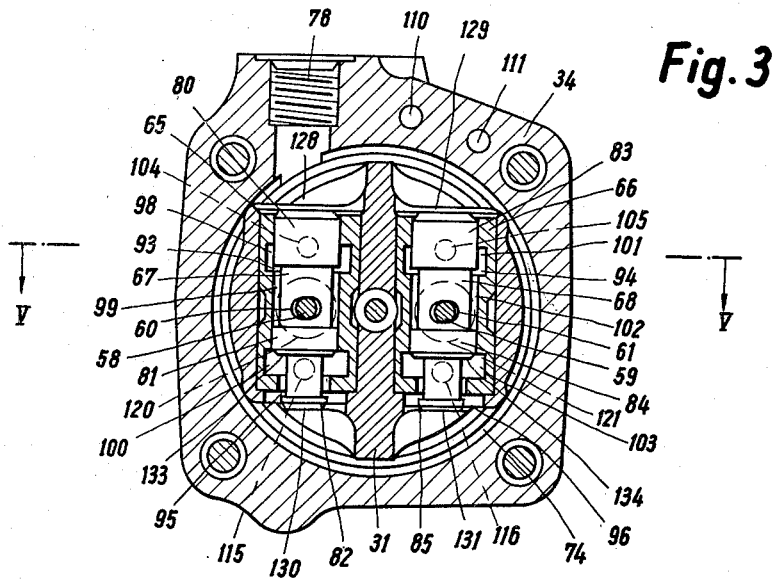
Figure 5:
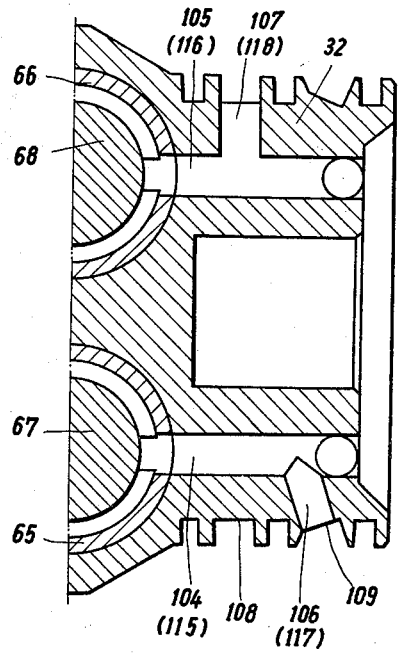
Figure 4:
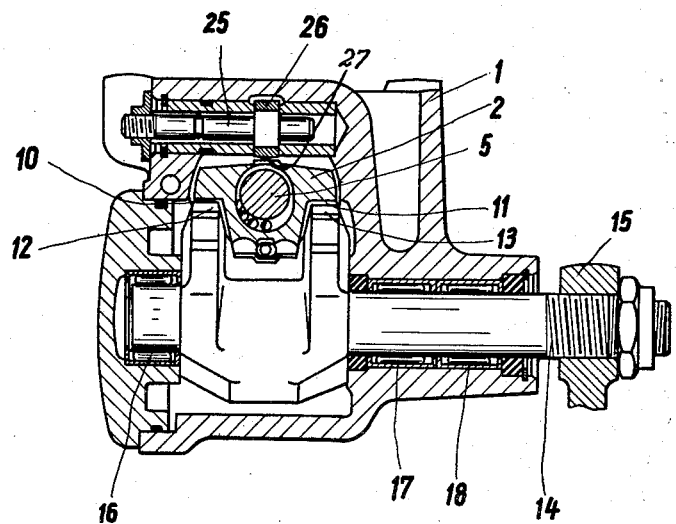

A detailed description of the invention now follows in conjunction with the appended drawing in which:

FIG. 1 is a longitudinal cross-section through a power boost mechanism of the invention;
FIG. 2 is a section through II—II of FIG. 1;
FIG. 3 is a section through III—III of FIG. 2;
FIG. 4 is a section through IV—IV of FIG. 1; and
FIG. 5 is a section through V—V of FIG. 3.

Referring now to the drawing, an auxiliary power boost steering mechanism is shown having a housing 1 accommodating a pressure-operated piston 2 axially movable in either direction and being threadedly carried via ball chains 3 and 4 on a steering worm 5. Piston 2 has the double-faced piston head 6, the faces being exposed to respective pressure chambers 8 and 9, whereby pressure on either piston face will effect movement of the piston in a well-known manner. Such movement of the piston is transmitted to shaft 14 connected to a steering linkage via collar 15 and supported on needle bearings 16, 17, and 18. The mode of transmission of force from the piston to shaft 14 is via a pair of racks 10 and 11 on flanges (see FIG. 4) carried by piston 2 and engaging gear sectors 12 and 13 respectively, which are integral with shaft 14 and rotate about the axis of such shaft. It will thus be apparent that reciprocation of the piston 2 will effect rotation of shaft 14 and thus effect steering in one direction or the other, depending upon the direction of movement of piston 2. It will also be apparent that due to the worm-thread connection between the steering shaft 5 and the piston via the ball chains, manual thrust on the piston will also cause reciprocation thereof by rotation of steering shaft 5, in a manner hereinafter disclosed.

A particular feature of the invention resides in the disposition of the racks 10 and 11 immediately adjacent the longitudinal central plane of worm shaft 5; such arrangement virtually eliminates any sidewise canting or tilting moment which might otherwise be brought to bear on the piston when transmitting linear force to the racks. The arrangement also makes it possible to minimize the distance between the shafts 5 and 14 for effecting compactness.

Within housing 1 there is disposed an eccentric shaft 25 (FIGS. 1 and 4) suitably trunnioned therein as shown, which carries a roller 26 to effect adjustment of play between the racks 10 and 11 and respective gear sectors 12 and 13. Thus, rotation of the eccentric shaft 25 will force roller 26 against a ridge 27 integral with piston 2 (FIG. 4). Thus, any play in the components or in possible inaccuracy of positioning of the piston and the cylinder can be compensated for in this manner. The shaft 5 carries a heavy, enlarged flange 31 which extends into a skirt 32. The flange 31 nests in a counterbore of a ring-like element or flange 33, as shown in FIGS. 1 and 2. Bearings, such as 36 and 37, support the skirt 32 against axial thrust; bearing 37 also supports the skirt radially via a collar 42 carried on needle bearings 45 concentric with a tubular shaft 47 which will be understood to be provided with splines, as shown by dotted lines for connection to a manually-operated steering rod (not shown). The tubular shaft 47 (FIG. 2) is thus rotatively and supportedly concentric with sleeve 42 and is itself, sealed, as shown, at its point of emergence from the end wall of the housing. For axial thrust support, the needle bearing arrangement 36 acts against a plate 39, abutting the bottom of a counterbore in the flanged ring 33.

The components just described, that is, the heavy flange 31, etc. are all carried within a housing 34 joined to the housing 1, with the ring 33 intermediate the two housings. It will, of course, be understood that the entire assembly is held together by suitable through-bolts as indicated by the four through-bolts shown in section (not numbered) in FIG. 3.

Within the tubular shaft 47 is a torsion bar 50 suitably pinned at one end, as by a pin 51 to the outer end of shaft 47. Similarly, the bar 50 is pinned at its other end, as by a pin 53, to the shaft 5. The torsion bar is a yieldable means and will deflect in torsion as shaft 47 is twisted. The torsional deflection operates valve means for power boost to be hereinafter described. However, the twisting force is transmitted via torsion bar 50 to shaft 5 for the purpose of effecting rotation of such shaft to thereby cause linear movement of piston 2 via ball chains 3 and 4, via racks 10 and 11. The piston movement can effect manual steering by rotation of shaft 14 and steering arm 15.

Torsional stress in bar 50 is caused by road resistance against the vehicle wheels, whereby shaft 47 rotates to a somewhat greater extent than flange 31. Such difference in relative rotation is taken advantage of to actuate valve means which control pressure fluid to the chambers 8 and 9 to give a power boost steering effect. The valve means comprises fixed valve sleeves 65 and 66 carried in suitable bores of the flange 31, on opposite sides of the axis of shaft 47, the axes of such sleeves being transverse of the flange axis. The valve sleeves carry valve pistons or spools 67 and 68, respectively, which are engaged by respective fingers 58 and 59 in respective slots 60 and 61, which fingers are carried by posts 56 and 57 secured to ears 54 and 55 integral with shaft 47, as will be seen upon comparison of FIGS. 1 and 3. As seen on FIGS. 1 and 2, an annular chamber 74 is provided in housing 34 for oil pressure distribution to the valve pistons, such chamber thus effecting a manifold for oil pressure from a conduit 78 (FIG. 3) which conduit will be understood to be connected to a pressure source such as a pump, not shown.

Each piston valve is comprised of three sections; thus, the piston valve 67 is comprised of the equal diameter sections 80 and 81 and a smaller diameter section 82. Likewise, the piston 68 is comprised of equal diameter sections 83 and 84 and the smaller diameter section 85, all as clearly seen on FIG. 3. The piston sections co-act with respective edges of grooves within the respective piston sleeves 65 and 66. Thus, the sleeve 65 has the grooves 98 and 100, while the sleeve 66 has the grooves 101 and 103. Intermediate grooves 98 and 100 is a straight, cylindrical section 99; similarly, intermediate the grooves 101 and 103 is a cylindrical section 102. Grooves 98 and 101 are connected with annular grooves 108 and 109, respectively, (FIGS. 1 and 5), in skirt 32, by means of respective bores 104 and 105, and also respective bores 106 and 107. Thus, grooves 108 and 109 have communication via ducts 110 and 111 (FIGS 2, 3), respectively, into the respective chambers 8 and 9 for actuating the piston 2. Other bores 115 and 116 (FIGS. 3, 5) connect, respectively, to the grooves 100 and 103 and, likewise, communicate with respective bores 117 and 118 and with the grooves 108 and 109, respectively, to communicate with respective pressure chambers 8 and 9. Grooves 99 and 102 communicate respectively with an exhaust pressure groove 127 (FIGS. 1, 2) provided in housing 34, by means of passages 120 and 121 (FIG. 3) provided in the respective valve sleeve 67 and 68, and also by means of passages 123 and 124 (FIG. 1), respectively, in said valve sleeves. The effective piston faces 128 and 129 (FIG. 3) and faces 133, 134, of the respective valve pistons 67 and 68 are larger, by a predetermined amount, than the faces of their respective piston sections 130 and 131, as hereinabove mentioned. Thus, a differential net force can act on either valve piston, as hereinafter explained, to give a resistance to manual rotation of the steering shaft. Thus the valve chamber which comprises the valve sleeves and the housings and flanges with their communicating and co-acting fluid passages maintain a valve balance for one valve and a valve unbalance for the other valve depending on the valve positions with respect to the valve sleeves and the grooves therein.

However, it should be noted at this time that all sections of the pistons may be made equal in order to eliminate such unbalance of force in instances where no "road feel" is desired.

The mode of operation of the invention is as follows:

When shaft 47 is turned in either direction, and such movement is opposed by road resistance in a well-known manner, the torsion bar 50 will experience a torsional strain proportional to the amount of road resistance against the vehicle wheels. Such strain will effect relative motion between the flange 31 and shaft 47. Accordingly, the fingers 58 and 59 will effect reciprocation of respective valve pistons 67 and 68 from the neutral position shown in the drawing, for example in FIG. 3. Obviously, one valve piston will move in one direction, while the other moves in an opposite direction, depending upon the direction of rotation of shaft 47. For example, considering FIG. 3, assume that valve 67 moves down while valve piston 68 moves up. The sleeve groove 103 will be shut off from the oil pressure manifold feed groove 74 by the piston section 131 at the throat 96. Meanwhile, the throat 94 is opened wide. Thus, chamber 9 is exhausted to return groove 127. However, chamber 8 is at this time being fed oil pressure from conduit 78.

Accordingly the piston moves from left to right as viewed on FIG. 1. At this time the valve piston head 131, closing off the throat 96 is subjected to a total overall pressure less than the total overall pressure on the valve piston face 129 due to the latter being larger in area. Therefore, a resistance to manual rotation of shaft 47 is effected since valve piston 68 must be moved upward against the differential total pressure existing between the smaller and larger faces.

In a similar manner rotation of shaft 47 in the opposite direction effects movement of valve piston 68 downwardly, thus opening up the throat 96 removes the pressure unbalance on valve 67, or neutralizes it. However, movement of valve piston 67 upwardly opens throat 93 and closes throat 95, a pressure unbalance is then effected for this valve piston operative to give the same road "feel" as was previously had.

The passage of oil at this time is, of course, into chamber 9 and out of chamber 8 under control of valve piston 68, whence piston 2 moves from right to left, as viewed on FIG. 1.

The actual sequence of communcation to the various grooves, channels, bores and passages for movement of piston to the left with pressure being fed to chamber 9 and exhausted from chamber 8 is sequentially as follows:

Pressure fluid to chamber 9 starts at the inlet conduit 78 and ring groove 74, thence to throat 96, bore 116, bore 118 and ring groove 108, thence through bore 108a to channel 111 and pressure chamber 9.

Return oil flows from 8 through channel 110, bore 109a to ring groove 109, thence to bores 106 and 104, ring chamber 98, 99; thence to slot 120, chamber 126, ring groove 127 and to return bore 127a.

The sequential flow for opposite movement of the piston with pressure going to chamber 8 and being exhausted from chamber 9 is as follows: Pressure fluid again starts at the inlet conduit 78 and ring grove 74; thence to throat 95, bores 115 and 117; thence to ring groove 109; thence through bore 109a to channel 110 and pressure chamber 8.

Return oil flows from chamber 9 through channel 111, bore 108a to ring groove 108; thence to bores 107 and 105, ring chamber 101, 102; thence to slot 121; thence again to chamber 126, ring grove 127 and return bore 127a.

Having thus described my invention I am aware that various changes can be made without departing from the spirit thereof, and accordingly do not seek to be limited

What is claimed is:

1. A power boost mechanism having a reversibly movable pressure-operated piston, a worm gear engaging said piston, torsion bar means having an end connected to said worm gear and having another end adapted to be rotated by a manually operated steering shaft, a pair of reciprocal valve spools carried by said worm gear and having axes substantially transverse thereof and on each side thereof, means carried at said other end of said torsion bar directly engaging said valve spools for alternately actuating said valve spools, and means whereby movement of said valve spools effects movement of said piston in a direction predetermined by the direction of movement of said valve spools.

2. In a power steering mechanism, a power cylinder having pressure chambers and having a double faced piston therein with faces exposed to respective pressure chambers, steering arm means and means for actuating said steering arm means responsive to motion of said piston, a manually rotative shaft and a piston actuating connection means intermediate said shaft and said piston whereby rotation of said shaft effects movement of said piston to actuate said steering arm means, said actuating connection means comprising an element yieldable under stress whereby rotation of said shaft effects a deflection of said yieldable element, and reciprocal valves actuated in response to said deflection to control fluid pressure to and from said chambers, said shaft being tubular, said yieldable element comprising a torsion bar within said tubular shaft, said actuating connection means including a piston shaft having drive connection engagement with said piston and having a radial flange, said torsion bar having one end secured to said piston shaft and another end secured to said tubular shaft, said valves being carried in said radial flange and actuator means carried by said tubular shaft directly engaging said valves for reciprocal actuation thereof upon rotation of said tubular shaft in either direction, wherein said valves are simultaneously reciprocal in opposite directions depending on direction of rotation of said tubular shaft.

3. In a power steering mechanism, a power cylinder having pressure chambers and having a double faced piston therein with faces exposed to respective pressure chambers, steering arm means and means for actuating said steering arm means responsive to motion of said piston, a manually rotative shaft and a piston actuating connection means intermediate said shaft and said piston whereby rotation of said shaft effects movement of said piston to actuate said steering arm means, said actuating connection means comprising an element yieldable under stress whereby rotation of said shaft effects a deflection of said yieldable element, and reciprocal valves actuated in response to said deflection to control fluid pressure to and from said chambers, said shaft being tubular, said yieldable element comprising a torsion bar within said tubular shaft, said actuating connection means including a piston shaft having drive connection engagement with said piston and having a radial flange, said torsion bar having one end secured to said piston shaft and another end secured to said tubular shaft, said valves being carried in said radial flange and actuator means carried by said tubular shaft directly engaging said valves for reciprocal actuation thereof upon rotation of said tubular shaft in either direction wherein said valves are simultaneously reciprocal in opposite directions depending on direction of rotation of said tubular shaft, said flange having a pair of bores having axes transverse to the axis of said tubular shaft, said valves being reciprocal in said bores.

4. In a device as set forth in claim 3, said actuator means comprising fingers extending from said tubular shaft, valve sleeves surrounding respective valves and being fixed in respective bores of said flange and having apertures through which said fingers pass to engage said valves, said apertures being of predetermined size so as to be abuttable edgewise by respective fingers to effect limits of motion of said fingers operative to determine the limits of torsional deflection of said torsion bar.

5. In a device as set forth in claim 4, said bores being disposed on opposite sides of the axis of said tubular shaft and having axes in a diametral plane thereof, said fingers being disposed on opposite sides of the axis of said tubular shaft and extending longitudinally thereof into respective apertures of said sleeves.

6. In a power steering mechanism, a power cylinder having pressure chambers and having a double faced piston therein with faces exposed to respective pressure chambers, steering arm means and means for actuating said steering arm means responsive to motion of said piston, a manually rotative shaft and a piston actuating connection means intermediate said shaft and said piston whereby rotation of said shaft effects movement of said piston to actuate said steering arm means, said actuating connection means comprising an element yieldable under stress whereby rotation of said shaft effects a deflection of said yieldable element, and reciprocal valves actuated in response to said deflection to control fluid pressure to and from said chambers, and means for effecting a pressure unbalance of either of said valves during actuation thereof to effect a resistance to turning of said rotative shaft in a respective direction, said valves being disposed transversely on respective sides of the shaft, and valve control means carried by said shaft on each side thereof for actuating said valves upon deflection of said yieldable element, said valve control means comprising elements on respective sides of said axis and having direct engagement with respective valves wherein said elements are rotative about said shaft axis to a sufficient extent to effect reciprocal motion of said valves transversely of said shaft.

7. In a power steering mechanism, a power cylinder having pressure chambers and having a double faced piston therein with faces exposed to respective pressure chambers, steering arm means and means for actuating said steering arm means responsive to motion of said piston, a manually rotative shaft and a piston actuating connection means intermediate said shaft and said piston whereby rotation of said shaft effects movement of said piston to actuate said steering arm, said actuating connection means comprising an element yieldable under stress and connected to said shaft whereby rotation of said shaft effects a deflection of said yieldable element, and valves having actuating means connected to said shaft and actuated in response to said deflection to actuate said valves to control fluid pressure to and from said chambers, wherein said valves comprise a pair of reciprocal valve pistons each having a section of a smaller diameter and a section of a larger diameter, a housing means whereby said sections are exposed to equal unit pressure, and means whereby movement of said valve pistons serves to shield the smaller diameter section of one of said valve pistons from said pressure for a predetermined portion of the overall area thereof while maintaining the larger diameter section of said valve piston exposed to said pressure, to effect a pressure unbalance on said valve piston for creating resistance to manual turning of said rotative shaft, the other valve piston being at that time in pressure balanced condition.

8. In a device as set forth in claim 7, said actuating means comprising elements carried by said shaft and engageable with said valve pistons on opposite sides of the axis of said rotative shaft for moving said valve pistons in opposite directions depending on direction of rotation of said rotative shaft.

9. In a device as set forth in claim 7, said smaller and larger sections of each of said valve pistons comprising an end section thereof, said housing means comprising a housing surrounding the end faces of said sections and having means for communication to a source of fluid pressure, means providing bores in which respective valve pistons are reciprocal, the smaller section of respective valve pistons being movable to a position outside the respective bore so as to be surrounded by pressure fluid to effect balance thereof and movable into a respective bore so as to have only an end face exposed to pressure fluid for effecting an unbalance thereof.

References Cited by the Examiner
UNITED STATES PATENTS

| | | | |
|---|---|---|---|
| 886,508 | 5/08 | Horat | 74—499 |
| 2,988,059 | 6/61 | Wysong | 180—79.2 XR |
| 3,033,051 | 5/62 | Reinke et al. | 74—388 |
| 3,099,167 | 7/63 | Folkerts | 74—388 |

DON A. WAITE, *Primary Examiner.*
BROUGHTON G. DURHAM, *Examiner.*